US012325323B2

(12) United States Patent
Rakshit et al.

(10) Patent No.: US 12,325,323 B2
(45) Date of Patent: Jun. 10, 2025

(54) RANGE DETERMINATION OF ELECTRIC VEHICLES (71) Applicant: TVS MOTOR COMPANY LIMITED, Chennai (IN)

(72) Inventors: Sourav Rakshit, Chennai (IN); Arpan Guha, Chennai (IN); Chetan Gupta, Chennai (IN); Rajendra Bhat, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 135 days.

(21) Appl. No.: 18/264,329

(22) PCT Filed: Feb. 1, 2022

(86) PCT No.: PCT/IN2022/050084
§ 371 (c)(1),
(2) Date: Aug. 4, 2023

(87) PCT Pub. No.: WO2022/168114
PCT Pub. Date: Aug. 11, 2022

(65) Prior Publication Data
US 2024/0034189 A1 Feb. 1, 2024

(30) Foreign Application Priority Data
Feb. 5, 2021 (IN) .............................. 202141005053

(51) Int. Cl.
*B60L 58/10* (2019.01)
*B60L 58/12* (2019.01)
*B60L 58/24* (2019.01)

(52) U.S. Cl.
CPC ............... *B60L 58/12* (2019.02); *B60L 58/24* (2019.02); *B60L 2240/425* (2013.01);
(Continued)

(58) Field of Classification Search
CPC ....................................................... B60L 58/10
See application file for complete search history.

(56) References Cited

U.S. PATENT DOCUMENTS 10,417,930 B1\* 9/2019 Fraser .................... G09B 9/058
2014/0272916 A1\* 9/2014 Seymour .............. G09B 23/188
434/379
(Continued)

FOREIGN PATENT DOCUMENTS

EP 3340131 A1 6/2018

OTHER PUBLICATIONS

International Search Report issued in corresponding International Application No. PCT/IN2022/050084 mailed May 11, 2022 (3 pages).
(Continued)

*Primary Examiner* — Long T Tran
(74) *Attorney, Agent, or Firm* — Osha Bergman Watanabe & Burton LLP (57) ABSTRACT

Techniques for determining range of electric vehicles are described. A sensor provides a signal indicative of the current being supplied by a battery of an electric vehicle to a motor of the electric vehicle. A controller receives the signal and determines the current supplied by the battery. The controller also receives a voltage supplied by the battery and determines a notional distance travelled by the electric vehicle. Based on the voltage, the current, and the notional distance, the controller determines the range of the electric vehicle.

18 Claims, 6 Drawing Sheets (52) U.S. Cl.
CPC ... *B60L 2240/461* (2013.01); *B60L 2240/547* (2013.01); *B60L 2240/549* (2013.01); *B60L 2260/52* (2013.01)

(56) References Cited

U.S. PATENT DOCUMENTS

| | | | |
|---|---|---|---|
| 2016/0114687 A1* | 4/2016 | Ichikawa | B60L 53/38 307/104 |
| 2021/0237578 A1* | 8/2021 | Ing | B60L 3/0069 |
| 2021/0287460 A1* | 9/2021 | Aono | G07C 5/008 |
| 2021/0287461 A1* | 9/2021 | Matsuda | B60W 30/09 |
| 2022/0057481 A1* | 2/2022 | Aono | G01S 7/40 |

OTHER PUBLICATIONS

Written Opinion issued in corresponding International Application No. PCT/IN2022/050084 mailed May 11, 2022 (7 pages).

* cited by examiner

RANGE DETERMINATION OF ELECTRIC VEHICLES

TECHNICAL FIELD

The present subject matter relates, in general, to electric vehicles and, in particular, to determination of range of electric vehicles.

BACKGROUND

An electric vehicle utilizes an electric motor to drive wheels of the electric vehicle. The electric motor may be supplied with electric power from a battery of the electric vehicle. A range of the electric vehicle refers to a distance travelled by the electric vehicle for a given quantity of energy supplied, such as in the form of charge supplied by the battery. The range may also be referred to as mileage of the electric vehicle.

BRIEF DESCRIPTION OF DRAWINGS

The features, aspects, and advantages of the present subject matter will be better understood with regard to the following description, and accompanying figures. The use of the same reference number in different figures indicates similar or identical features and components.

DETAILED DESCRIPTION

A range of an electric vehicle may have to be accurately determined to determine the efficiency of the electric vehicle and to identify the presence of an underlying condition that may cause a low range. Conventional techniques for determining the range of the electric vehicle may require changes to the electric vehicle. For instance, a measurement device may have to be added in series with powertrain of the electric vehicle to determine the range. As another example, a battery of the electric vehicle may have to be taken out of the electric vehicle for the range determination. The changes to the electric vehicle increase the complexity associated with the range determination. Further, some techniques may depend on components, such as the controllers and sensors, of the electric vehicle for determining the range. For instance, the speed of the electric vehicle and the current supplied to the electric motor may be determined based on measurements provided by the components of the electric vehicle. The range determined may be inaccurate if the components of the electric vehicle are faulty.

The present subject matter relates to range determination of electric vehicles. With the implementations of the present subject matter, range of the electric vehicle can be determined in a simple and an accurate manner.

In an implementation of the present subject matter, a system is provided for range determination of an electric vehicle. The system includes a sensor and a controller. The electric vehicle may also be referred to as an EV or a vehicle, and may be, for example, a two-wheeler. The EV may include a battery that supplies electric power to an electric motor (also referred to as "motor") for driving the wheels of the EV. The EV may be disposed on a test bench for determination of the range.

The sensor may generate a signal indicative of a current being supplied by the battery to the motor. The sensor is to be disposed in a non-contact arrangement relative to a wire that is to supply the current. For example, the sensor may be disposed proximate to, but not in contact with, the wire. In an example, the sensor may be a Hall element, which generates a voltage proportional to the current passing through the wire.

The controller may receive the signal generated by the sensor and may accordingly determine the current supplied by the battery to the motor. The controller may also receive an indication of the voltage supplied by the battery. Based on the voltage and the current, the controller may determine the power and energy supplied by the battery.

The controller may also determine a notional distance travelled by the EV. The notional distance corresponds to a number of rotations of a wheel, such as a rear wheel, of the electric vehicle while being disposed on the test bench. In an example, the notional distance may be determined based on the number of rotations of rollers of the test bench. The rollers may be in contact with the wheel of the vehicle and may rotate in response to the rotation of the wheel.

The controller may determine the range based on the voltage, the current, and the notional distance. For example, the controller may determine the notional distance travelled in a period of time and the energy supplied by the battery in the period of time, and accordingly determine the range.

The present subject matter provides an efficient and accurate manner of determining a range of an EV. The range determination can be performed without making any changes to the components of the EV or connections between the components. For instance, the current supplied by the battery to the motor can be determined without altering the connection between the battery and the motor and without taking the battery and the motor out of the EV. Further, the non-contact arrangement for the current determination also prevents any damage to the system due to a high current flow to the motor and allows providing small-sized components for the current determination.

The range determination according to the present subject matter may be performed in a controlled environment, such as with controlled temperature, and by subjecting the vehicle to predetermined conditions, such as predetermined speed, acceleration, and load. Therefore, inaccuracies in range determination that may arise due to variation in the factors affecting the range, such as speed, acceleration, load, and temperature, are prevented.

The above and other features, aspects, and advantages of the subject matter will be better explained with regard to the following description, appended claims, and accompanying figures.

Figure 1:
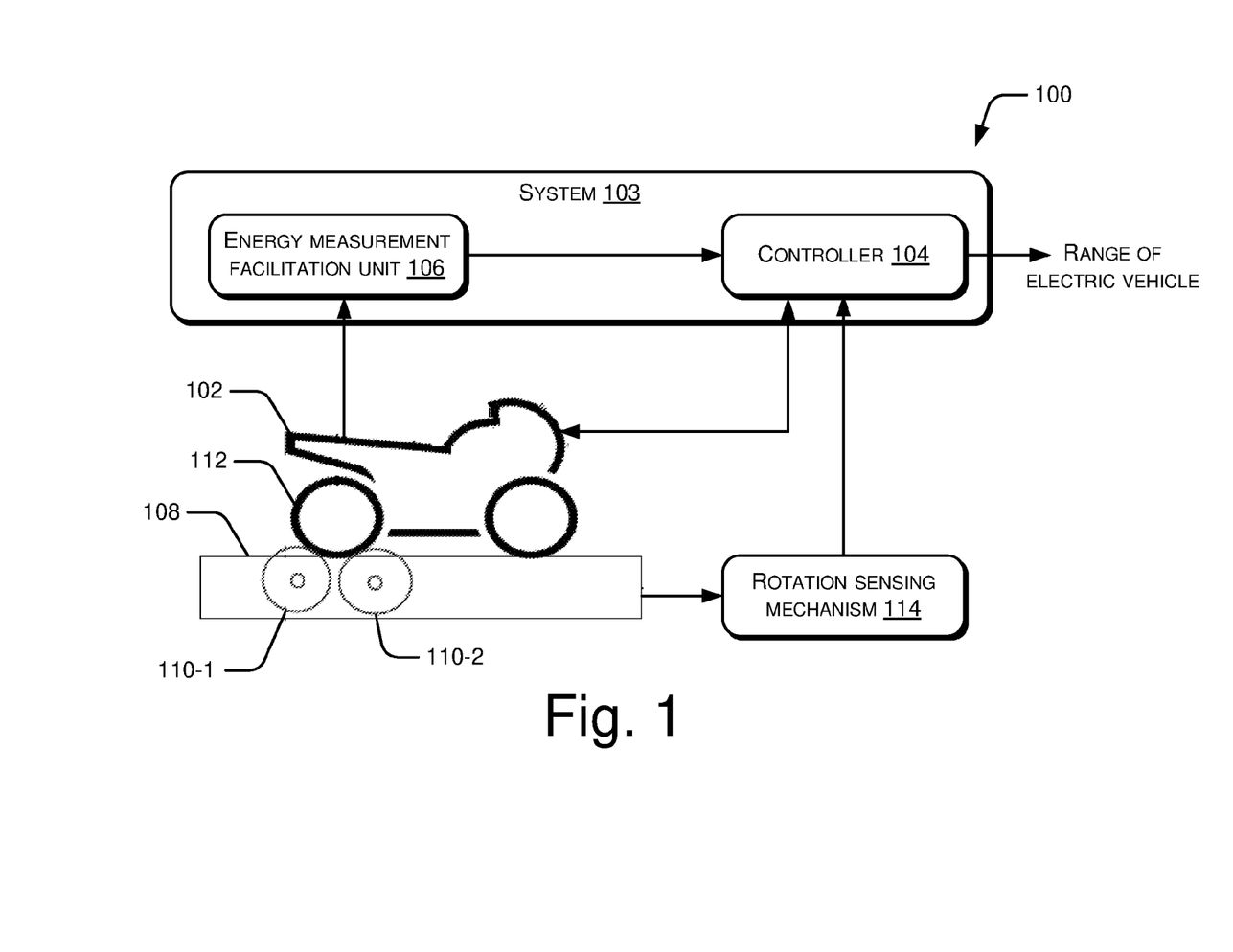
FIG. 1 illustrates a schematic representation of a test setup that is used to determine a range of an electric vehicle (EV), in accordance with an implementation of the present subject matter.

FIG. 1 illustrates a schematic representation of a test setup 100 that is used to determine a range of an electric vehicle (EV) 102, in accordance with an implementation of the present subject matter. The EV 102 may also be referred to as the vehicle 102. The range of the EV 102 may refer to a distance that the EV 102 travels for a given amount of energy supplied to the EV 102. In an example, the EV 102 may be a new EV that is yet to be sold. The range of the new EV may be determined to verify whether the range is an acceptable value and whether the EV may be released for sale. In another example, the EV 102 may be one that is already being used by a rider. In accordance with this example, the EV 102 may be brought for range determination in response to a complaint from the rider that the range of the EV 102 is less than a nominal range.

The test setup 100 may include a system 103 to perform the range determination. The system 103 includes a controller 104. To perform the range determination, the controller 104 may receive information from an energy measurement facilitation unit (EMFU) 106 that can be used for computing the energy consumed by the EV 102. The EMFU 106 may be part of the system 103. In an implementation, a part or the whole of EMFU 106 and the controller 104 may be provided as part of one printed circuit board (PCB) (not shown in FIG. 1). The information provided by the EMFU 106 may include a voltage supplied by a battery (not shown in FIG. 1) of the EV 102 to a motor (not shown in FIG. 1) of the EV 102 for driving the EV 102. The EMFU 106 may also provide a signal indicative of a current supplied by the battery to the motor to the controller 104. To generate the signal indicative of the current supplied, the EMFU 106 may include a sensor (not shown in FIG. 1). The sensor may be disposed in a non-contact arrangement relative to a wire that supplies the current. The controller 104 may determine the current supplied by the battery based on the signal received from the sensor. In an example, the sensor may be a Hall element, as will be explained with reference to FIG. 5. Further, the signal supplied by the sensor may be the voltage induced in the Hall element.

The test setup 100 may include a test bench 108 on which the EV 102 may be disposed for the range determination. The test bench 108 may include a first roller 110-1 and a second roller 110-2 (collectively referred to as "rollers 110"). The EV 102 is disposed on the test bench 108 such that a drive wheel, such as a rear wheel 112, of the EV 102 is in contact with the rollers 110. Accordingly, when the wheel rotates, the translational movement of the EV 102 is restricted (i.e., the EV 102 remains stationary on the test bench 108) by the rollers 110, and the rollers 110 rotate. The number of rotations of the rear wheel 112 corresponds to a notional distance travelled by the EV 102. The notional distance may refer to the translational distance that the EV 102 would have travelled for the rotation of the wheels, had the movement of the EV 102 not been restricted by the rollers 110. In an implementation, the EV 102 may be subjected to a load of a predefined weight, such as 75 kilograms, to simulate the weight exerted by a rider of the EV 102.

A rotation sensing mechanism 114 of the test setup 100 may sense rotation of the rollers 110 per unit time. To enable the rotation sensing, in an implementation, one of the rollers 110 includes a metal tip and the rotation sensing mechanism 114 includes a magnetic proximity sensor (not shown in FIG. 1) that faces the roller. The metal tip may cut the magnetic flux of the magnetic proximity sensor during each rotation of the roller. The cutting of the magnetic flux causes a corresponding voltage to be output by the magnetic proximity sensor. Thus, the output of the corresponding voltage may indicate the completion of one rotation of the rollers 110. Although not illustrated, the rotation sensing mechanism 114 may also be part of the system 103. Since the number of rotations of the rollers 110 corresponds to the number of rotations of the wheels of the EV 102, the number of rotations of the rollers 110 indicates the notional distance travelled by the EV 102. For instance, if the radius of the rollers 110 is 'R', the notional distance travelled by the EV 102 for one rotation of the rollers 110 is $2\pi R$. Further, the notional distance travelled by the EV 102 for 'N' rotations of the rollers 110 is $N*2\pi R$. The notional distance may be determined by the controller 104 based on the number of rotations of the rollers 110 as sensed by the rotation sensing mechanism 114. In another implementation, the controller 104 may determine the notional distance based on a speed signal provided by a speed sensor (not shown in FIG. 1) of the EV 102.

The controller 104 may then determine the range of the EV 102 based on the voltage, the current, and the notional distance. For instance, the controller 104 may determine the energy supplied by the battery for driving the EV 102 as a product of the voltage supplied by the battery, the current supplied by the battery, and a period of time for which the voltage and the current are supplied. Further, the notional distance covered in the period of time may be determined as explained above. Accordingly, the range may be calculated as a ratio of the notional distance to the energy supplied.

In an example, if the range is less than a nominal range, the EV 102 may be sent for troubleshooting, so that the fault(s) causing the reduced range are identified and rectified. If the range determined is equal to or more than a nominal range and if the EV 102 is a new EV that is yet to be sold, the EV 102 may be released for sale. If the EV 102 is one that is already being used by a rider and if the range determined is equal to or more than a nominal range, the rider may be informed that the EV 102 does not have a fault and that the low range of the EV 102 may be due to other reasons, such as driving on a hilly terrain, aggressive driving behaviour (e.g., over speeding), or the like.

Figure 2:
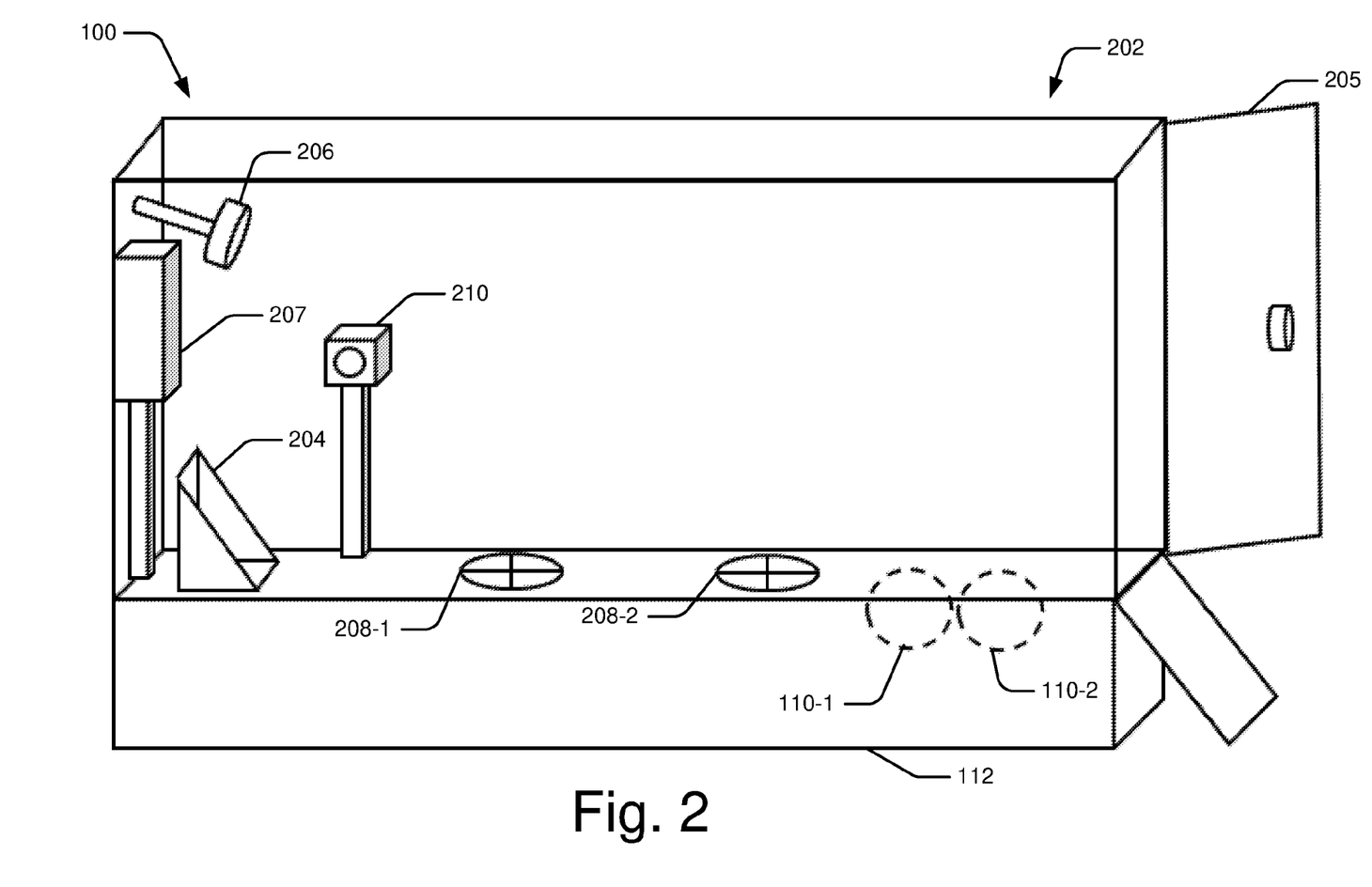
FIG. 2 illustrates a test setup, in accordance with an implementation of the present subject matter.

FIG. 2 illustrates the test setup 100, in accordance with an implementation of the present subject matter. The test setup 100 includes a chamber 202 in which the EV 102 (not shown in FIG. 2) may be disposed for the range determination. The chamber 202 may also have the test bench 108 disposed therein. As mentioned earlier, the EV 102 may be disposed on the test bench 108 such that the rear wheel 112 of the EV 102 is rotatably connected to the rollers 110. Further, the movement of a front wheel of the EV 102 may be restricted by a front wheel lock 204. The chamber 202 may be closed using a door 205 after the EV 102 is placed in the chamber 202. The chamber 202 may be illuminated by a lamp 206.

The test setup 100 also includes a controller housing 207 that houses the controller 104 (not shown in FIG. 2). The controller housing 207 may also house the EMFU 106 (not shown in FIG. 2). The controller 104 determines the range of the EV 102 based on inputs from the EMFU 106 and the rotation sensing mechanism 114 (not shown in FIG. 2). In an implementation, the rotation sensing mechanism 114 may be disposed near the first roller 110-1. The controller 104 may also control the temperature of the chamber 202 during the range determination. The temperature may be controlled because the ambient temperature affects the temperature of the battery, and the temperature of the battery affects the performance of the battery. As will be understood, the performance of the battery impacts the range of the EV 102. In an example, if the battery is a lithium-ion battery (LIB), the battery provides acceptable performance if its temperature is within the range of −20° C.-60° C. Further, the range of the EV 102 reduces for temperatures outside of this temperature range. This is because, outside of this temperature range, problems that degrade the performance of the LIB, such as lithium plating and thermal runaway, may occur.

Accordingly, for an accurate range determination, the controller 104 may maintain the temperature of the chamber 202 such that the temperature of the battery is within the range of −20° C.-60° C. In an implementation, the controller 104 may receive the temperature of the battery from a battery management system (BMS) corresponding to the battery and accordingly control the temperature of the chamber 202. Thus, a closed-loop control of temperature of the chamber 202 is achieved. The controller 104 may control the temperature of the chamber 202 by controlling a temperature control system (not shown in FIG. 2) of the chamber 202. The temperature control system may include, for example, a heat pump and temperature vents 208-1 and 208-2 (collectively referred to as temperature vents 208) disposed in the chamber 202. The heat pump may be positioned below the temperature vents 208.

By performing the range determination for an acceptable temperature range of the battery, it may be ensured that the range determination is not performed during a reduced performance of the battery. Thus, a false positive result (a result indicating that the EV 102 has a fault that caused it to have a low range, even though the low range was a result of the reduced performance of the battery) is prevented.

Further, in an example, the controller 104 may vary the temperature of the chamber 202 and may perform the range determination for the various temperatures, so that the range values for various temperatures of the battery can be monitored.

The controller 104 may also control the speed and acceleration of the EV 102 during the range determination, as the speed and the acceleration may also impact the range. To control the speed and the acceleration, the controller 104 may control a throttle control system 210 that is disposed in the chamber 202 and that is to be coupled to a throttle of the EV 102. The throttle control system 210 may include a servomotor, as will be explained with reference to FIG. 4. In another implementation, the throttle control system 210 may include a robot for controlling the throttle of the EV 102.

By controlling the speed and the acceleration, it may be ensured that the range value determined is not impacted by the driving pattern of a driver. Thus, a low range value obtained due to aggressive driving behaviour of a driver, such as excessive acceleration and driving at high speeds, is prevented, thereby preventing false positive results and accurate determination of the range value. Further, in an example, the controller 104 may vary the speed and the acceleration to determine the range values for various speed and acceleration values.

Figure 3:
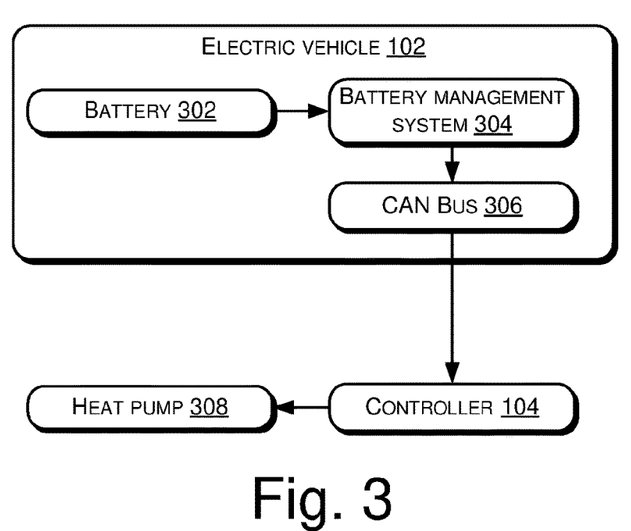
FIG. 3 illustrates connections between a controller and various other components to control the temperature of a battery of an EV, in accordance with an implementation of the present subject matter.

FIG. 3 illustrates connections between the controller 104 and various other components to control the temperature of a battery 302 of the EV 102, in accordance with an implementation of the present subject matter. The battery 302 may be, for example, an LIB. The battery 302 may be managed by a battery management system (BMS) 304. The management functions performed by the BMS 304 may include, for example, monitoring temperature of the battery 302, monitoring voltage and current supplied by the battery 302, and controlling recharging of the battery 302. The BMS 304 may provide the parameters relating to the battery 302, such as the temperature of the battery 302, on a Controller Area Network (CAN) bus 306 of the EV 102. In another example, the BMS 304 may provide the parameters to a diagnostic port (not shown in FIG. 3) of the EV 102.

The controller 104 may receive the temperature of the battery 302 through the CAN bus 306 or the diagnostic port. Based on the temperature, the controller 104 may operate or control the heat pump 308. The control of the heat pump 308 may control the temperature of the chamber 202, so that the temperature of the battery 302 may be controlled.

Figure 4:
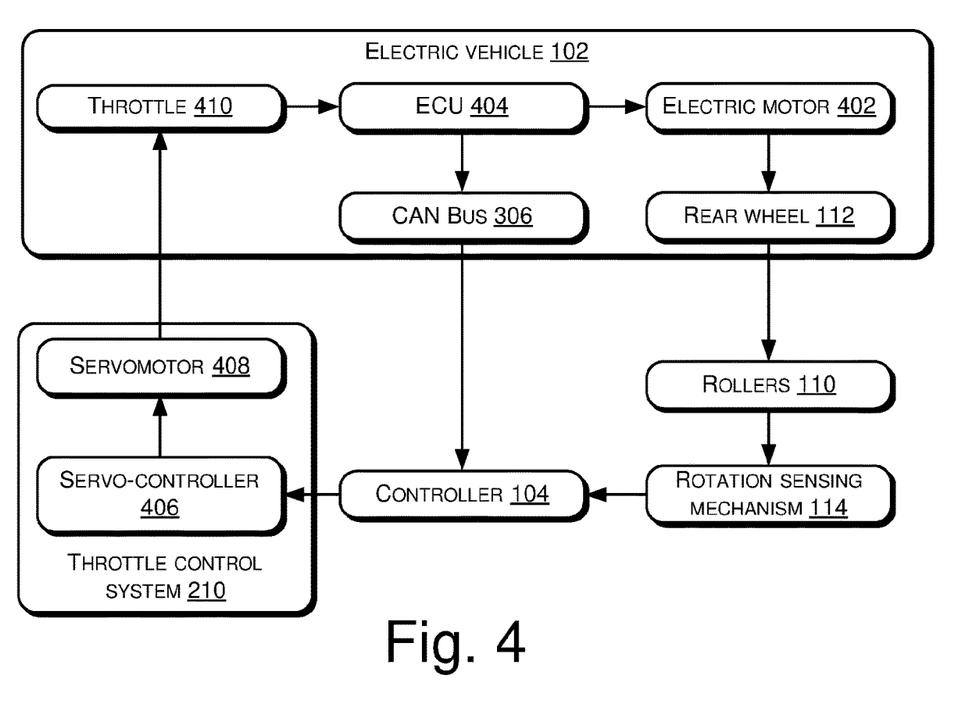
FIG. 4 illustrates connections between a controller and various other components for controlling the speed and acceleration of an EV, in accordance with an implementation of the present subject matter.

FIG. 4 illustrates connections between controller 104 and various other components for controlling the speed and acceleration of the EV 102, in accordance with an implementation of the present subject matter. The EV 102 includes an electric motor 402 (also referred to as "the motor 402") to drive the rear wheel 112 of the EV 102. The motor 402 may be controlled by an electronic control unit (ECU) 404 of the EV 102.

The rear wheel 112 may be rotatably connected to the rollers 110, which causes rotation of the rollers during rotation of the rear wheel 112, as explained above. The rotation of the rollers 110 may be sensed by the rotation sensing mechanism 114, which generates a rotation signal indicative of the rotation of the rollers 110. Based on the rotation signal, the controller 104 may determine the speed of rotation of the rear wheel 112. For instance, the controller 104 may determine the speed of rotation based on a number of rotations of the rollers 110 per unit time, as explained earlier. In addition, in an implementation, the controller 104 may determine the speed of rotation based also on a speed signal received from the EV 102. The speed signal may be provided by the ECU 404. The speed signal may be provided at the CAN bus 306.

In an example, the controller 104 may compare the speed determined based on the rotation signal and the speed determined based on the speed signal. Based on the comparison, the controller 104 may determine if a speed sensor of the EV 102 is faulty. For instance, if a speed determined based on the rotation signal and a speed determined based on the second speed signal are significantly different (e.g., the difference between the two speeds exceeds a threshold), the controller 104 may infer that such a difference is due to a fault in the speed sensor of the EV 102, which caused generation of the speed signal. Based on the determination of the fault, the controller 104 may provide an error message. Thus, in addition to range determination, the controller 104 also enables identification of fault in the speed sensor of the EV 102.

Upon determination of the speed, the controller 104 may also control the speed, the acceleration, or both of the EV 102. To control the speed and/or acceleration, the controller 104 may provide a command to a servo-controller 406 of the throttle control system 210. The command may include, for example, a commanded value of speed, a commanded value of acceleration, or both. Based on the command, the servo-controller 406 may control a servomotor 408 of the throttle control system 210. The servomotor 408 may be coupled to a throttle 410 of the EV 102 and may actuate the throttle 410. Based on the actuation of the throttle 410, the ECU 404 may control the motor 402, for controlling the speed and/or acceleration of the EV 102. Thus, the controller 104 may perform the range determination at a desired value of the speed and/or acceleration.

Figure 5:
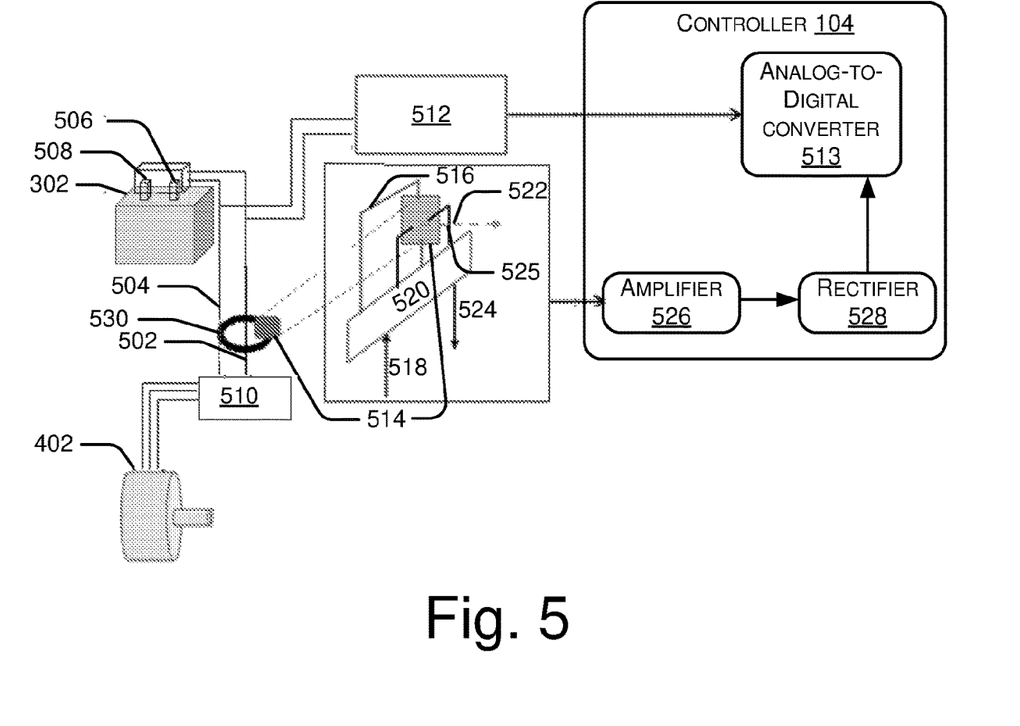
FIG. 5 illustrates the determination of the voltage and the current supplied by a battery to a motor by a controller, in accordance with an implementation of the present subject matter.

FIG. 5 illustrates the determination of the voltage and the current supplied by the battery 302 to the motor 402 by the controller 104, in accordance with an implementation of the present subject matter. The battery 302 may be connected to the motor 402 through wires 502 and 504, which may be, for example, part of a wiring harness (not shown in FIG. 5). The wire 502 may be connected to a positive terminal 506 of the battery 302 and the wire 504 may be connected to a negative terminal 508 of the battery 302. The wires 502 and 504 may be connected to the motor 402 through a motor controller 510. The motor controller 510 controls operation of the motor 402 and may also convert the Direct Current (DC) voltage supplied by the battery 302 into an Alternating Current (AC) voltage for operating the motor 402. In an example, the motor 402 may be a three-phase motor. Accordingly, the AC voltage generated by the motor controller 510 may be a three-phase AC voltage.

The terminals 506 and 508 may also be connected to a voltage measurement unit 512, so that the voltage measurement unit 512 can measure the voltage supplied by the battery 302 to the motor 402. The voltage measurement unit 512 may be a part of the EMFU 106. In an example, the voltage measurement unit 512 may be implemented in the form of an integrated circuit (IC). The IC may be part of a PCB that also includes the controller 104. The voltage measurement unit 512 may indicate the measured voltage to the controller 104. In an example, the measured voltage may be received by an analog-to-digital converter (ADC) 513 of the controller 104. The ADC 513 may digitize the measured voltage, which is in the form of an analog signal, for further processing.

Further, a Hall element 514 may be provided near the wire 502, which is connected to the positive terminal 506 of the battery 302, to enable measurement of the current supplied by the battery 302 to the motor 402. The Hall element 514 may be part of the EMFU 106. The Hall element 514 may be provided as part of the PCB having the controller 104 or outside of the PCB. The Hall element 514 may be provided in a non-contact arrangement relative to the wire 502, and may be for example, 2-3 centimetres away from the wire 502. The Hall element 514 may be supplied with a constant bias current through a connection 516 by supplying a bias voltage 518 to terminal 520.

A magnetic field generated due to the flow of the current in the wire 502 may induce a voltage ($V_H$) in the Hall element 514. The strength of the magnetic field is directly proportional to the magnitude of the current flowing in the wire 502. Further, the magnitude of the voltage $V_H$ induced is directly proportional to the strength of a component 522 of the magnetic field that is perpendicular to the surface of the Hall element 514. Thus, the value of the voltage $V_H$ is indicative of the current supplied by the battery 302. An additional voltage component $V_{COM}$, also referred to as a baseline voltage, may also be generated in the Hall element 514 due to the influence of the magnetic field. The value of the baseline voltage does not change with the change in the strength of the magnetic field, and may be a characteristic voltage of the Hall element 514. Thus, a voltage 524 induced in the Hall element 514 is a sum of two components: a component $V_H$ that is proportional to the strength of the magnetic field and a baseline voltage $V_{COM}$ that does not vary with the magnetic field. The voltage 524 induced in the Hall element 514 may be recovered from the terminal 520 through a connection 525.

The voltage 524 induced in the Hall element 514 may be received by the controller 104. In an implementation, the voltage 524 may be received by an amplifier 526 of the controller 104. The amplifier 526 may subtract the baseline voltage $V_{COM}$ from the voltage 524 and may amplify the remaining portion, i.e., the voltage $V_H$, of the voltage 524. The amplifier 526 may be, for example, a differential amplifier. Thus, an amplified version of the voltage that varies according to the strength of the magnetic field component 522 is obtained. The amplified voltage may be rectified by a rectifier 528 and digitized by the ADC 513. Based on the digitized signal, the controller 104 may then determine the current supplied by the battery 302.

The measurement of the current in the above-explained manner ensures that the battery 302 is not to be taken out of operation or out of the EV 102 for determining the range. Further, since the components involved in the current measurement are not directly connected to the wire 502, the components are protected from a high value of current that may be supplied by the battery 302. Further, such an indirect connection also reduces the sizes of the components to be used for the current measurement.

In an implementation, the current measured may also be utilized by the controller 104 for determining a depth of discharge (DOD) of the battery 302, which is a fraction of the total charge that has been removed from the battery 302. The DOD is the complement of State of Charge (SOC) of the battery 302—as DOD increases, the SOC decreases. The DOD may be mathematically represented as below:

$$DOD = \frac{C_{released}}{C_{rated}} \times 100$$

where $C_{released}$ is the amount of charge discharged by the battery 302 and Crated is the rated charging capacity of the battery 302.

By determining the current supplied by the battery 302 and the time for which the current being supplied, the controller 104 may determine the DOD of the battery 302. Further, the controller 104 may compare the determined DOD with the DOD determined by the ECU of the EV 102. The controller 104 may receive the DOD determined by the ECU through, for example, the diagnostic port of the EV 102. Based on the comparison, the controller 104 may determine whether the DOD determined by the ECU is correct. In this manner, the controller 104 may validate the DOD determined by the ECU, and may also detect any error in the DOD determined by the ECU.

In an implementation, the EMFU 106 further includes a metal core 530 proximate to the wire 502 and the Hall element 514. The function of the metal core 530 will be explained below with reference to FIG. 6.

Figure 6:
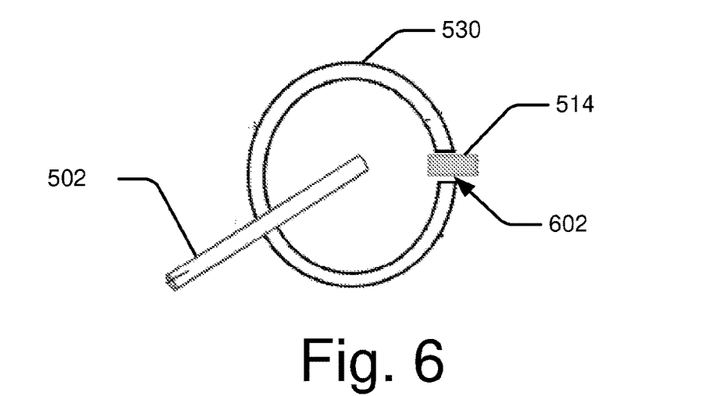
FIG. 6 illustrates the disposition of a metal core and a Hall element relative to a wire, in accordance with an implementation of the present subject matter.

FIG. 6 illustrates the disposition of the metal core 530 and the Hall element 514 relative to the wire 502, in accordance with an implementation of the present subject matter. The metal core 530 may have a high magnetic permeability and may be made of, for example, Permalloy (which has about 80% Nickel and 20% of Iron content). The metal core 530 may be in the form of a strip. When the current flowing from the battery 302 is to be measured, the metal core 530 may be bent and disposed such that it surrounds the wire 502 and a gap 602 is formed between the two ends of the metal core 530. Further, the Hall element 514 may be disposed in the gap 602. The clearance between the Hall element 514 and the ends of the metal core 530 may be less than the gap between the Hall element 514 and the wire 502. In an example, the clearance may be in the order of a few millimetres, such as 2-3 millimetres.

Due to its high magnetic permeability, bulk of the magnetic flux generated due to the current passing through the wire 502 passes through the metal core 530. Thus, the metal core 530 acts as a flux concentrator. Further, due to the small clearance between the ends of the metal core 530 and the Hall element 514, a significant portion of the magnetic flux flowing on the metal core 530 reaches the Hall element 514. Thus, by using the metal core 530, the amount of the magnetic flux generated that reaches the Hall element 514 is increased. Thus, the value of the voltage $V_H$ generated when the metal core 530 is used is higher than that generated when the metal core 530 is not used. Thus, the use of the metal core 530 increases the sensitivity of the Hall element 514.

Figure 7:
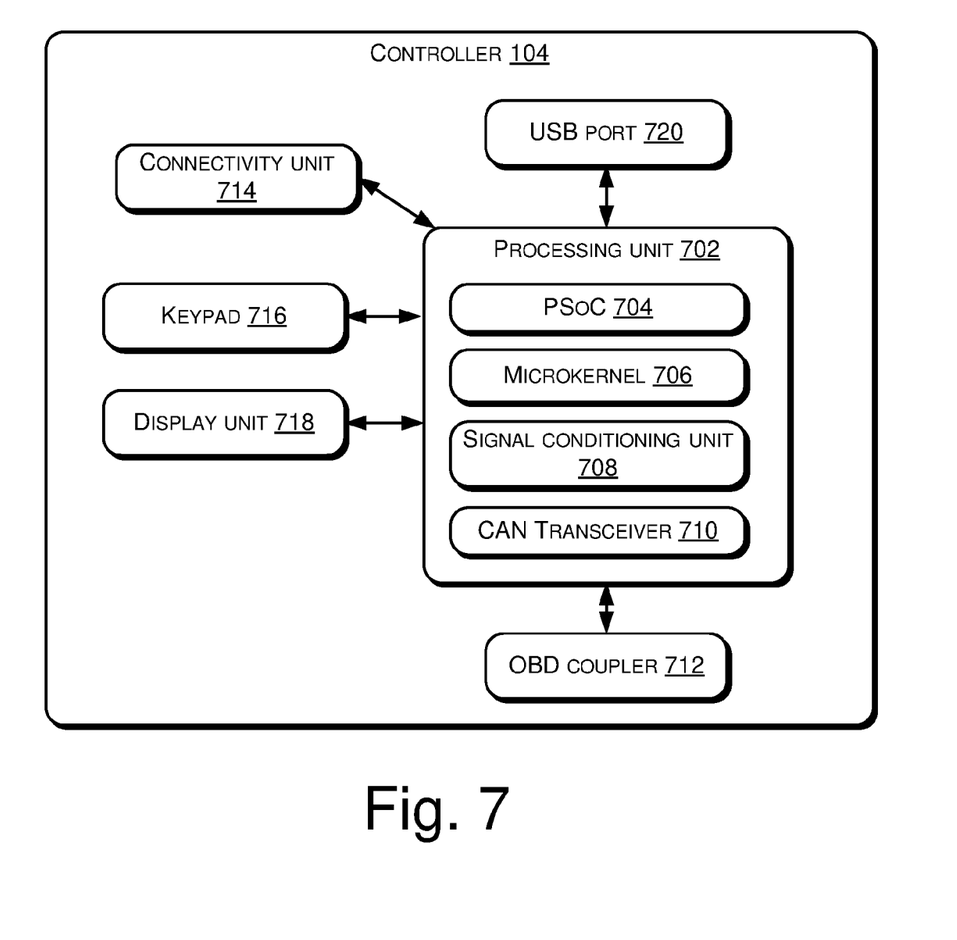
FIG. 7 illustrates components of a controller, in accordance with an implementation of the present subject matter.

FIG. 7 illustrates the components of the controller 104, in accordance with an implementation of the present subject matter. The controller 104 includes a processing unit 702 that performs the various processing tasks involved in the range determination. The processing unit 702 includes a programmable system-on-a-chip (PSoC) 704, which is a family of microcontroller integrated circuits (ICs). The ICs include a central processing unit (CPU) core and mixed-signal arrays of configurable integrated analog and digital peripherals. The PSoC 704 may perform the computations involved in the range determination, such as determination of the energy expended by the battery 302 and the notional distance travelled by the EV 102. The PSoC 704 may utilize a microkernel 706 to perform the computations. The microkernel 706 may include instructions that can be executed by the PSoC 704 to implement an operating system (OS). Further, the microkernel 706 may include instructions executable by the PSoC 704 to perform the computations.

The processing unit 702 further includes a signal conditioning unit 708 that conditions the signals received by the controller 104 in a manner that the signals can be processed by the PSoC 704. The signal conditioning unit 708 may include the ADC 513 (not shown in FIG. 7), which digitizes the signals received from the EMFU 106, as explained earlier. The signal conditioning unit 708 may also include the amplifier 526 and the rectifier 528.

The processing unit 702 may also include a CAN transceiver 710 that can receive information, such as temperature of the battery 302 and the speed of the EV 102, from the CAN bus 306 of the EV 102.

In addition to the processing unit 702, the controller 104 also includes an on-board diagnostics (OBD) coupler 712 that enables connection between the controller 104 and the ECU of the EV 102 for obtaining diagnostics information, such as information regarding a fault in the EV 102, from the EV 102. The OBD coupler 712 may be connected to the CAN bus or the diagnostic port of the EV 102. A connectivity unit 714 allows network connectivity, such as Local Area Network (LAN) connectivity and Wireless Fidelity (Wi-Fi) connectivity, to the controller 104. A keypad 716 may be utilized to provide inputs to the controller 104 and a display unit 718 may be utilized to provide outputs from the controller 104. Further, a Universal Serial Bus (USB) port 720 may be utilized for flashing and troubleshooting the controller 104.

Using the techniques described above, the actual range of an EV is determined. Although the determination is not impacted by environmental factors, such as a high ambient temperature or driving on a hilly terrain, such environmental factors have a long-term effect on the range of the EV. For example, if the EV 102 was used for a long time in regions having a high ambient temperature, the battery 302 may have undergone some deterioration due to prolonged exposure to high temperatures. Further, if the EV 102 was used for a long time at high altitudes, the EV 102 may have undergone some deterioration. Thus, the range to be expected from an EV, i.e., the nominal range for the EV may vary from region to region. To determine the nominal range for an EV, ranges determined in the above manner for EVs from a given region are collected. The EVs from which the range values are to be collected may be selected based on the age or the total distance travelled by the EVs. For example, range values may be collected from EVs that have travelled for a distance less than 2000 kilometres. The range values collected from a given region may be subjected to statistical techniques, such as mean and median determination. Based on the statistical techniques, the nominal range corresponding to a region may be determined. The nominal range corresponding to the region may be compared with the range determined for the EV 102, to determine whether the EV 102 is to be subjected to troubleshooting. In this manner, a false positive result indicating that the EV 102 has a low range, even though the low range was due to unfavourable environmental factors the EV 102 was subjected to, is prevented.

In an implementation, a dependence of the nominal range of an EV on various environmental factors may be modelled based on the range values obtained from various regions. Such a dependence may then be used to calculate the nominal range for any region. For example, using range values from various regions and the environmental factors from those regions as inputs, a mathematical function representing the nominal range as a function of the environmental factors may be derived. Such a derivation may be performed using a regression technique, such as linear regression. Using the mathematical function, the nominal range for a region having a set of environmental factors may be calculated.

Figure 8:
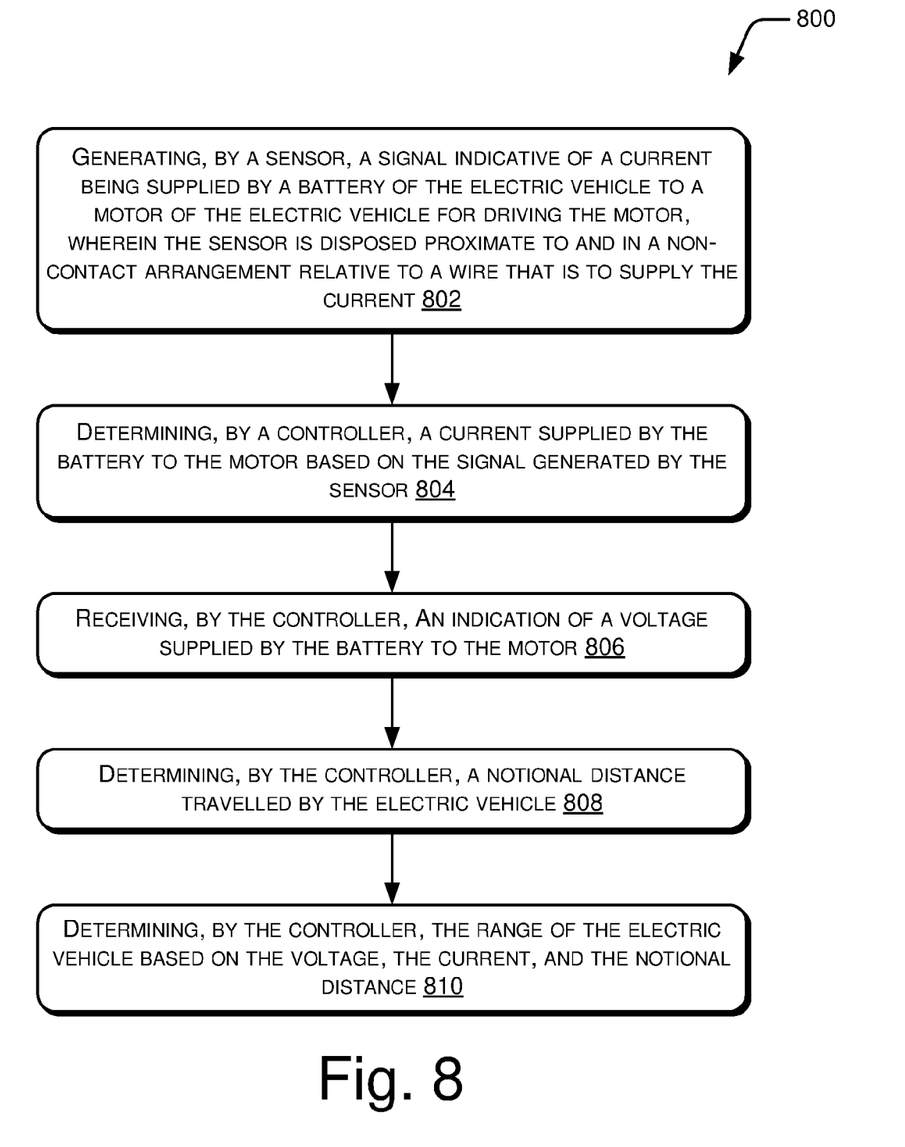
FIG. 8 illustrates a method for determination of a range of an EV, in accordance with an implementation of the present subject matter.

FIG. 8 illustrate a method 800 for determination of a range of an electric vehicle (EV), in accordance with an implementation of the present subject matter. The order in which the method 800 is described is not intended to be construed as a limitation, and any number of the described method blocks may be combined in any order to implement the method 800, or an alternative method. The steps of the method 800 may be performed by a system, such as the system 103, having a sensor, such as the Hall element 514, and a controller, such as the controller 104.

At block 802, the sensor generates a signal indicative of a current being supplied by a battery of the EV to a motor of the EV. The EV may be, for example, the EV 102. The current may be supplied for driving the motor. The sensor is disposed proximate to and in a non-contact arrangement relative to a wire, such as the wire 502, that is to supply the current.

At block 804, the controller determines a current supplied by the battery to the motor based on the signal generated by the sensor, as explained with reference to FIG. 5(a). Further, at block 806, the controller receives an indication of a voltage supplied by the battery to the motor.

At block 808, the controller may determine a notional distance travelled by the EV. The notional distance may be determined based on the number of rotations of the rollers, such as the rollers 110, that are coupled to the wheel of the EV, as explained with reference to FIG. 1. Further, at block 810, the controller may determine the range of the EV based on the voltage, the current, and the notional distance.

In an implementation, the method 800 includes controlling, by the controller, the speed and acceleration of the electric vehicle through a servomotor coupled to a throttle of the electric vehicle. Further in an implementation, the method 800 includes controlling, by the controller, temperature of a chamber in which the electric vehicle is disposed to control the temperature of the battery through a heat pump in the chamber.

In an implementation, the method 800 includes comparing the range determined with a nominal range. The nominal range corresponds to a region in which the electric vehicle is driven, as explained earlier. Based on the comparison, it may be determined whether the EV has a fault causing it to have a low range. For example, if the determined range value is lower than the nominal range by a threshold value, it may be determined that the EV has a fault. The nominal range may be determined based on range values of a plurality of EVs that are driven in the region. For example, the range values of a plurality of EVs that are driven in the region may be subjected to a statistical technique to calculate the nominal range, as explained earlier.

The method 800 may also include determining a dependence of the nominal range on a plurality of environmental factors of the region, such as average ambient temperature, altitude (e.g., mean sea level) based on a regression technique, such as linear regression.

The present subject matter provides an efficient and accurate manner of determining a range of an EV. The range determination can be performed without making any changes to the components of the EV or connections between the components. Further, the non-contact arrangement for the current determination also prevents any damage to the system due to a high current flow to the motor and allows providing small-sized components for the current determination.

The range determination according to the present subject matter may be performed in a controlled environment, such as with controlled temperature, and by subjecting the vehicle to predetermined conditions, such as predetermined speed, acceleration, and load. Therefore, inaccuracies in range determination that may arise due to variation in the factors affecting the range, such as speed, acceleration, load, and temperature, are prevented. Further, the techniques of the present subject matter can be implemented with minimal changes to existing test setups used for range determination of other types of vehicles, such as vehicles driven by an internal combustion engine.

The present subject matter can also be used for determining a depth of discharge of a battery of the EV and can also be used for validating the depth of discharge computed by the EV. Further, errors in the speed sensor of the EV can also be determined using the present subject matter.

Although the present subject matter has been described with reference to specific embodiments, this description is not meant to be construed in a limiting sense. Various modifications of the disclosed embodiments, as well as alternate embodiments of the subject matter, will become apparent to persons skilled in the art upon reference to the description of the subject matter.

We claim:

1. A system for determining a range of an electric vehicle, the system comprising:
a sensor to generate a signal indicative of a current being supplied by a battery of the electric vehicle to a motor of the electric vehicle for driving the motor, wherein the sensor is to be disposed in a non-contact arrangement relative to a wire that is to supply the current; and
a controller to:
determine the current supplied by the battery to the motor based on the signal generated by the sensor;
receive a voltage supplied by the battery to the motor;
determine a notional distance travelled by the electric vehicle, wherein the notional distance corresponds to a number of rotations of a wheel of the electric vehicle while being disposed on a test bench; and
determine the range of the electric vehicle based on the voltage, the current, and the notional distance.

2. The system as claimed in claim 1, wherein the sensor is a Hall element, wherein the signal generated by the sensor is a voltage generated by the Hall element, wherein the voltage comprises a component that is proportional to a magnetic field, the magnetic field being proportional to the current passing through the wire.

3. The system as claimed in claim 2, comprising a metal core that is to surround the wire and wherein the Hall element is to be disposed in a gap between ends of the metal core.

4. The system as claimed in claim 1, wherein the controller is to determine the notional distance based on one of:
a rotation signal provided by a rotation sensing mechanism, wherein the rotation sensing mechanism is to detect rotation of a roller that is to be rotatably connected to the wheel of the electric vehicle; and
a speed signal provided by a speed sensor of the electric vehicle.

5. The system as claimed in claim 4, wherein the controller is to:
determine a speed of the electric vehicle based on the rotation signal;
compare the determined speed with the speed signal; and
determine that the speed sensor of the electric vehicle is faulty based on the comparison.

6. The system as claimed in claim 1, wherein the controller is to control speed and acceleration of the electric vehicle through a servomotor to be coupled to a throttle of the electric vehicle.

7. The system as claimed in claim 1, wherein the controller is to:
receive temperature of the battery from a battery management system (BMS) corresponding to the battery; and
control temperature of a chamber in which the electric vehicle is disposed to control the temperature of the battery through a temperature control system of the chamber.

8. The system as claimed in claim 1, wherein the controller comprises:
a programmable system on a chip (PSoC);
a microkernel;
a controller area network (CAN) transceiver; and
a signal conditioning unit.

9. The system as claimed in claim 1, wherein the controller is to:
determine a depth of discharge of the battery based on the current supplied by the battery;
compare the determined depth of discharge of the battery with a depth of discharge determined by the electric vehicle; and
determine whether the depth of discharge determined by the electric vehicle is correct based on the comparison.

10. A test setup for determining a range of an electric vehicle, the test setup comprising:
a chamber;
a test bench that is disposed in the chamber and on which the electric vehicle is to be placed, wherein the test bench comprises rollers that are to be rotatably connected to a wheel of the electric vehicle;
a sensor that is disposed in the chamber and that is to generate a signal indicative of a current being supplied by a battery of the electric vehicle to a motor of the electric vehicle for driving the motor; and
a controller that is disposed in the chamber and that is to:
determine the current supplied by the battery to the motor based on the signal generated by the sensor;
receive a voltage supplied by the battery to the motor;
determine a notional distance travelled by the electric vehicle based on a number of rotations of the rollers; and
determine the range of the electric vehicle based on the voltage, the current, and the notional distance.

11. The test setup as claimed in claim 10, comprising a heat pump, wherein the controller is to control a temperature of the chamber through the heat pump.

12. The test setup as claimed in claim 10, comprising:
a throttle control system that is disposed in the chamber and that is to be coupled to a throttle of the electric vehicle, wherein the controller is to control speed and acceleration of the electric vehicle through the throttle control system.

13. The test setup as claimed in claim 10, comprising a rotation sensing mechanism to sense the number of rotations of the rollers.

14. A method for determining a range of an electric vehicle, the method comprising:
generating, by a sensor, a signal indicative of a current being supplied by a battery of the electric vehicle to a motor of the electric vehicle for driving the motor, wherein the sensor is disposed proximate to and in a non-contact arrangement relative to a wire that is to supply the current;
determining, by a controller, a current supplied by the battery to the motor based on the signal generated by the sensor;
receiving, by the controller, an indication of a voltage supplied by the battery to the motor;
determining, by the controller, a notional distance travelled by the electric vehicle; and
determining, by the controller, the range of the electric vehicle based on the voltage, the current, and the notional distance.

15. The method as claimed in claim 14, comprising at least one of:
controlling, by the controller, speed and acceleration of the electric vehicle through a servomotor coupled to a throttle of the electric vehicle; and
controlling, by the controller, temperature of a chamber in which the electric vehicle is disposed to control the temperature of the battery through a heat pump in the chamber.

16. The method as claimed in claim 14, comprising:
comparing the range with a nominal range, wherein the nominal range corresponds to a region in which the electric vehicle is driven; and
determining whether the electric vehicle has a fault causing it to have a low range based on the comparison.

17. The method as claimed in claim 16, comprising determining the nominal range based on range values of a plurality of electric vehicles that are driven in the region.

18. The method as claimed in claim 16, comprising determining a dependence of the nominal range on a plurality of environmental factors of the region based on a regression technique.

* * * * *